(12) United States Patent
French et al.

(10) Patent No.: US 8,945,648 B2
(45) Date of Patent: Feb. 3, 2015

(54) FRIED FOOD PRODUCT WITH REDUCED OIL CONTENT

(75) Inventors: Justin French, Frisco, TX (US); Girish Ganjyal, Plano, TX (US); Christopher James Koh, Southlake, TX (US)

(73) Assignee: Frito-Lay North America, Inc., Plano, TX (US)

( * ) Notice: Subject to any disclaimer, the term of this patent is extended or adjusted under 35 U.S.C. 154(b) by 261 days.

(21) Appl. No.: 13/308,285

(22) Filed: Nov. 30, 2011

(65) Prior Publication Data

US 2013/0136834 A1     May 30, 2013

(51) Int. Cl.
*A23L 1/01*     (2006.01)

(52) U.S. Cl.
USPC ........................................................ 426/438

(58) Field of Classification Search
USPC ................. 426/438–439, 403, 550, 804, 808; 99/404, 405
See application file for complete search history.

(56) References Cited

U.S. PATENT DOCUMENTS

| | | | |
|---|---|---|---|
| 2,177,166 A | 5/1938 | Bemis | |
| 3,966,983 A | 6/1976 | Dexter | |
| 4,189,994 A | 2/1980 | Schmader | |
| 4,325,295 A | 4/1982 | Caridis | |
| 4,503,127 A | 3/1985 | Fan | |
| 4,741,912 A | 5/1988 | Katz | |
| 4,844,930 A | 7/1989 | Mottur | |
| 4,923,705 A | 5/1990 | Mottur | |
| 4,929,461 A | 5/1990 | Schonauer | |
| 4,933,199 A * | 6/1990 | Neel et al. | 426/438 |
| 4,956,189 A | 9/1990 | Johnson | |
| 4,980,187 A | 12/1990 | Johnson | |
| 5,643,626 A * | 7/1997 | Henson et al. | 426/438 |
| 5,846,589 A | 12/1998 | Baker | |
| 6,067,899 A | 5/2000 | Caridis | |
| 6,558,724 B1 | 5/2003 | Caridis | |
| 7,303,777 B2 | 12/2007 | Baas | |
| 2006/0083831 A1 | 4/2006 | Caridis | |
| 2008/0138480 A1 | 6/2008 | Bows | |
| 2009/0304878 A1 | 12/2009 | Loehn | |
| 2010/0021602 A1 | 1/2010 | Caridis | |

FOREIGN PATENT DOCUMENTS

EP     0026565 B1     4/1981

* cited by examiner

*Primary Examiner* — Steven Leff

(74) *Attorney, Agent, or Firm* — James R. Gourley; Colin P. Cahoon; Carstens & Cahoon, LLP

(57) ABSTRACT

A method and system for producing fried food pieces with reduced oil content is disclosed. The food pieces are immersion fried in hot oil at a first temperature to an intermediate moisture content, and finish fried at a second, higher oil temperature to a final moisture content.

9 Claims, 2 Drawing Sheets

FRIED FOOD PRODUCT WITH REDUCED OIL CONTENT

BACKGROUND OF THE INVENTION

1. Technical Field

The present invention relates to an improved method and system for the production of a fried snack food with reduced oil content.

2. Description of Related Art

Conventional potato chip products are prepared by the basic steps of slicing peeled, raw potatoes, water washing the slices to remove surface starch and frying the potato slices in hot oil until a moisture content of about 1% to 2% by weight is achieved. The fried slices are then salted or seasoned and packaged.

Raw potato slices normally have moisture contents from 75% to 85% by weight depending on the type of potato and the environmental growing conditions. When potato slices are fried in hot oil, the moisture present boils. This results in burst cell walls and the formation of holes and voids which allow for oil absorption into the potato slices yielding significant oil contents.

The oil content of potato chips is important for many reasons. Most important is its contribution to the overall organoleptic desirability of potato chips. Too high an oil content may render the chips greasy or oily and hence less desirable to consumers. On the other hand, it is possible to make chips so low in oil that they lack flavor and seem harsh in texture. Some nutritional guidelines also indicate it is desirable to maintain a diet low in oil or fat.

Numerous attempts have been made in the prior art to reduce the oil content in potato chips. However, past attempts at producing lower oil content chips are either expensive, use technology that requires longer than desirable deoiling dwell time, or have failed to maintain the desired organoleptical properties such as taste and texture that have become familiar to consumers of traditional potato chips having higher fat or oil contents.

Consequently, a need exists for a process that enables the production of a fried food product such as a potato chip that has lower levels of oil than a traditionally fried food product, but that retains desirable organoleptic properties similar to traditional potato chips.

SUMMARY OF THE INVENTION

The proposed invention provides a method and system for producing fried food pieces. In one embodiment, food pieces are par-fried by immersion in hot oil at a first temperature, and then finish fried by contact with hot oil at a higher second temperature. In a preferred embodiment, the finish frying step is accomplished by passing the par-fried food pieces through a hot oil curtain.

The fried food pieces produced according to the present invention contain less oil than conventionally fried food pieces, yet retain the desirable visual, taste, and textural qualities of the higher oil fried food pieces.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
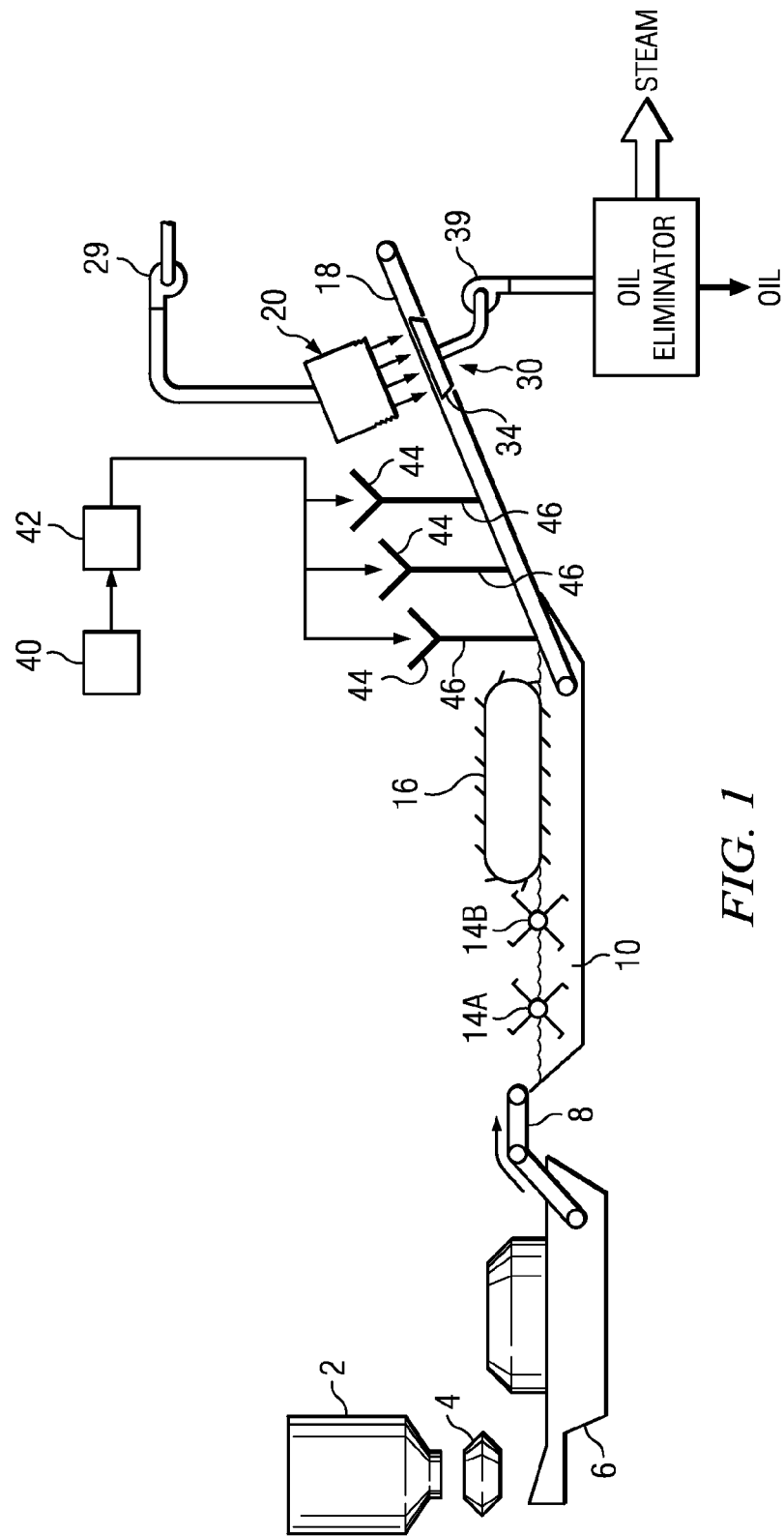
FIG. 1 is a schematic representation of one embodiment of the method and system of the present invention.

The present invention is directed to a method and system for producing fried food products with reduced oil content. In general, when food products are fried in hot oil, moisture leaves the food product as steam, and the food product absorbs some of the oil in which it is fried. The embodiments described below are directed towards fried potato slices, but the invention in its broadest application applies to any food product that absorbs oil in the process of being fried and during subsequent cooling. The invention is designed to reduce, but not eliminate, the overall oil content of the finished food product.

Whole potatoes stored in hopper 2 are dispensed into a slicing apparatus 4 which drops potato slices into a water wash 6. The wash step is optional.

In a preferred embodiment, the frying oil entering the fryer is maintained at an initial temperature between about 320° F. to about 380° F. more preferably between about 335° F. and about 370° F. Any conventional frying medium can be used in accordance with various embodiments of the present invention, including frying mediums with digestible and/or non-digestible oils. In one embodiment, the fryer is a continuous single flow or multizone fryer which utilizes devices such as paddle wheels, 14A and 14B, and a submergible conveyor belt 16 to control the flow of potato slices (not shown) through the fryer 10.

Because the present invention can be applicable to foods other than sliced potatoes, the aspects of the invention involving frying and post-frying processing may now be described generally as pertaining to food pieces. Food pieces can include whole or pieces of a variety of fruits and vegetables, as well as legumes, nuts and seeds. Food pieces can also include fabricated chip products such as fabricated potato chips and tortilla chips. Food pieces may also include extruded collets made from corn meal or other starchy ingredients, which may be direct expanded extruded products or non-expanded extruded products.

In one embodiment of the present invention, the potato slices or food pieces are par-fried to an intermediate moisture content and then removed from the fryer, preferably by a perforated endless belt conveyor 18 (sometimes referred to as a takeout conveyor). If no hot oil is added to the frying oil or if the oil is not otherwise heated during frying, at the location the perforated endless belt conveyor 18 contacts the frying oil, the frying oil comprises a final par-fry temperature of between about 290° F. to about 330° F. and more preferably between about 300° F. to about 320° F. The final par-fly oil temperature, as that term is used herein, of the first immersion frying step is the oil temperature at the location of the takeout means. For a continuous frying process, the takeout means will typically comprise a takeout conveyor 18, as depicted in FIG. 1, and for a batch process the takeout means will typically be a perforated basket or takeout conveyor. In either case, the final par-fly oil temperature is the temperature of the oil at the location of the food pieces as they are being removed from the oil by the takeout means.

In one embodiment, the food pieces exit the fryer comprising an oil content of between about 30% and about 45% by weight, and an intermediate moisture content above 2% by weight, or in another embodiment above 3% by weight. In one embodiment, the intermediate moisture content is between about 1.5% and about 15% by weight, or in another embodiment, between about 3% and about 10% by weight, or combinations of the foregoing ranges. In a preferred embodiment, the par-fried food pieces comprise an intermediate moisture content between about 2% and 10% by weight, and most preferably between about 3% and 6% by weight. Preferably, the final moisture content of the food pieces is less than about 10%, and more preferably less than about 5%, by weight of the food products below the intermediate moisture content of the food pieces.

As shown in FIG. 1, the slices are then subjected to a hot oil finish frying step, which in a preferred embodiment, is accomplished by one or more hot oil curtains 46 disposed over the takeout conveyor 18. A hot oil curtain 46 is a volume of oil flowing from an oil dispenser 44 above the takeout conveyor 18, through the food products on the takeout conveyor and the takeout conveyor. Preferably, the hot oil curtain 46 spans substantially the entire width of the takeout conveyor. Oil from the hot oil curtain 46 can be collected underneath the takeout conveyor in its own receptacle separate from the hot oil used for immersion frying, or can drain into the hot oil used for immersion frying. The oil used for the hot oil curtain is fed from an oil source 40, optionally through a heat exchanger 42, and into the oil dispensers 44 above the takeout conveyor 18. In one embodiment, the oil source 40 is a source of fresh or reconditioned oil, and in another embodiment, the oil source 40 is the same oil used in the immersion fryer 10. In one embodiment, the temperature of the hot oil curtain is greater than the final par-fry oil temperature of the first immersion frying step.

Applicants have measured the vapor pressure of water inside a potato slice at different product temperatures and moisture contents. It was found that in order to maintain the vapor pressure inside the potato chip above 14.7 psia (or approximately atmospheric pressure), the product temperature must be above about 270° F. to 310° F. at moisture contents ranging from 1% to 2% moisture content. Therefore, Applicants theorize that the product temperature must be at least this high in order for water vapor inside the potato chip to resist the absorption of oil via capillary action. In fact, the product temperature must likely be even higher than these temperatures to overcome gravitational and capillary forces that may also favor absorption of oil, and will certainly need to be higher if water vapor is used to expel oil from the void spaces within the potato chip. Moreover, the oil temperature must be higher than the desired product temperature to account for the commercially needed high rates of heat transfer between the oil and the product. In fact, Applicants have discovered that when an oil temperature of 340° F. is used in the finish frying step, no oil is removed or absorbed in the final product as compared to products that are fried to their final moisture content in one frying step. By contrast, a finish frying oil temperature of 290° F. causes more oil to be absorbed by the final product, and a finish frying oil temperature of 390° F. causes less oil to be absorbed in the final product.

In one embodiment, the temperature of the hot oil curtain is at least about 350° F., and in a preferred embodiment at least about 385° F. In a preferred embodiment, the temperature of the hot oil curtain is greater than 340° F. and less than 415° F. In another embodiment, the difference between the final par-fry oil temperature in the first frying step and the initial finish-fly oil temperature in the finish frying step is at least 30° F. In a preferred embodiment, the difference is at least 50° F. In a most preferred embodiment, the system of the present invention is configured with the ability to feed oil at different temperatures to each oil dispenser 44 to allow for a highly controlled finish frying step.

In this embodiment, the food pieces are subjected to a first frying step by immersion in oil at a first temperature, followed by a second frying step by passing the food products under at least one hot oil curtain at a second temperature, which is greater than the first temperature. A known process for continuous immersion frying of potato slices uses an initial oil temperature of 350° F. to 360° F., a final oil temperature of about 270° F. to 320° F., and a residence time of about 190 seconds. If hot oil is not added to the system, the oil cools as the food pieces are fried. The potato slices exit this frying process at a moisture content of about 1.4% by weight. In one embodiment of the inventive process described herein, potato slices are immersion fried at about the same initial oil temperature and on the same continuous frying equipment, but the residence time is reduced to about 80 seconds to 180 seconds, or in a preferred embodiment the residence time is reduced to about 80 seconds to 130 seconds. Then, as described above, the slices are removed from the hot oil, preferably as a product bed on a takeout conveyor, and subjected to finish frying by passing the product bed under at least one hot oil curtain.

In another embodiment, the first immersion frying step is followed by a second, short time, high temperature immersion frying step. In this embodiment, the takeout conveyor from the first step can feed the par-fried food products into a second volume of oil maintained at a higher temperature than the oil temperature used for the first immersion frying step. More than one conveyor, or a different transfer means, may be used between the frying steps. For par-fried potato slices, preferably the residence time in the second immersion fryer is less than about 10 seconds, and more preferably less than about 5 seconds, to bring the moisture content of the potato slices to a final moisture content of less than 2% by weight for washed potato slices, and less than about 2.5% by weight for unwashed kettle-style potato chips. The finish fried food products can be removed from the second volume of oil by any convenient means, such as a second takeout conveyor or a perforated basket.

Figure 2:
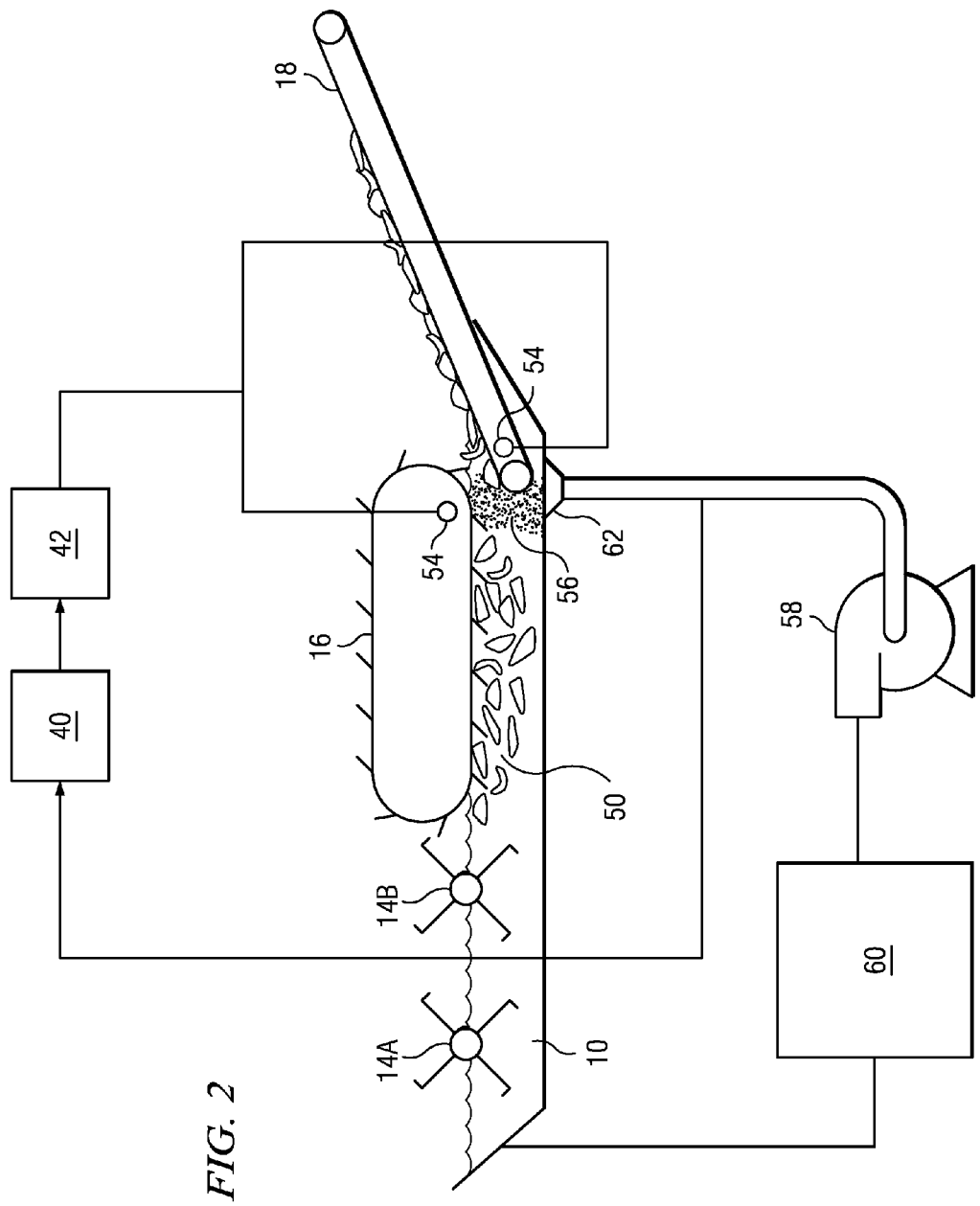
FIG. 2 is a schematic representation of another embodiment of the method and system of the present invention.

In still another embodiment, depicted in FIG. 2, the products being fried by immersion in hot oil can be subjected to a hot oil finish frying step by providing a submerged hot oil curtain inside the frying oil 10. One example of a submerged hot oil curtain is depicted by the shaded region 56 of FIG. 2. In the embodiment depicted in FIG. 2, the submerged hot oil curtain 56 is provided by at least one hot oil dispenser 54 located above the product bed 50 as it passes under the submerger 16. In a preferred embodiment, the submerged hot oil curtain 56 is supplemented by at least one oil dispenser 54 located below the product bed 50 as it moves from the submerger 16 to the takeout conveyor 18. The oil dispensers 54 can be fed by a fresh oil source 40 which is heated by a heat exchanger 42, but may also be fed, in whole or in part, by oil recycled from the fryer.

Because only a short hot oil finish fry time is required to realize the advantages of the present invention, the submerged hot oil curtain can represent a narrow band or region of oil between the submerger 16 and takeout conveyor 18. The hot oil is restricted to the regions inside the fryer near the oil dispensers 54 because the recirculation system drain 62 is located near the product exit end of the fryer. The recirculation system uses at least one pump 58 and heat exchanger 60 to recycle the oil to the product entrance end of the fryer. This maintains a well-defined region of hot oil in close proximity to the submerger 16 and takeout conveyor 18 that constitutes the submerged hot oil curtain 56.

Providing a submerged hot oil curtain may provide advantages over other embodiments with respect to oil quality and product coverage. Because the oil in the submerged hot oil curtain will be in contact with air for a shorter period of time than the hot oil curtain located above the takeout conveyor, the oil in the submerged oil curtain may not oxidize as quickly. Also, the fact that the products are already submerged in oil when they pass through the submerged oil curtain will also help provide more uniformly cooked food products. As can be seen in FIGS. 1 and 2, the hot oil curtain in either hot oil curtain embodiment is in close proximity to the takeout conveyor.

Applicants have discovered that the inventive process has several surprising advantages over known frying methods.

First, the fried food products that are produced by the invention comprise a lower oil content than food products subjected to known immersion frying processes. In one embodiment, potato slices produced by the inventive method comprise an oil content of about 30%, whereas potato slices produced using only an immersion frying step would comprise an oil content of about 35%. This result was surprising because the inventive fried food products also have flavor, color and texture characteristics similar to fried food products produced by known frying methods. Even though the invention is not limited by theory, Applicants believe that the hot oil finish frying step reduces oil content in several ways.

The viscosity of frying oil generally decreases with increasing temperature. Applicants believe that the hotter oil used in the finish frying step of the present invention drains more efficiently from the slices on the takeout conveyor.

The hot oil also likely causes a rapid increase in chip temperature which converts most of the water remaining inside the potato slices into steam, which exits the slices. Applicants believe that this steam also ejects a portion of the oil that had been absorbed into the slice during immersion frying. Applicants have observed that when typical potato slices are fried using previous immersion frying methods, after a residence time in the oil of between about 80 seconds and 130 seconds, the bubbling of potato slices inside the fryer slows substantially—a point referred to as the bubble end point. The bubble end point will vary according to potato slice (or generally food product) characteristics and oil temperature, but regardless of conditions the bubble end point is visually perceptible by a skilled artisan. Applicants believe that at this point, the remaining water inside the potato slices has stopped converting to steam as efficiently as before, and oil starts absorbing into the potato slices after the bubble end point. As described herein, in one embodiment Applicants propose to remove the potato slices from the first frying step before or shortly after the bubble end point, and subject them to a short time/higher temperature finish frying step to remove the remaining water and reduce the oil content of the final product. In one embodiment, the potato slices are removed from the first frying step within about 10 seconds of (before or after) the bubble end point. In another embodiment, the potato slices are removed from the first frying step less than about 50 seconds after the bubble end point, and in a preferred embodiment less than about 30 seconds after the bubble end point. Applicants have found that when the potato slices are then transferred to a hotter oil finish frying step, the potato slices bubble rapidly as the water remaining in the slices is converted to steam.

Especially in the hot oil curtain embodiment, the fact that the hot oil is not continuously in contact with the food product during the final frying step is also thought to resist the absorption of oil. Also, because the food pieces are kept hot during the second frying step, water vapor present inside the potato chip will remain in the vapor state for a longer period of time and resist oil uptake that is believe to occur during cooling.

Second, the equipment used to carry out the inventive method can be easily retrofitted onto existing frying equipment. Equipment that can be retrofitted reduces the capital costs of implementing the inventive method. Perhaps more importantly, the inventive method can dramatically increase the capacity and throughput of existing frying equipment. As stated above, the immersion frying time for potato chips can be reduced from about 190 seconds to between 80 and 130 seconds (preferably, between about 100-120 seconds). Such a reduced frying time could allow an existing fryer that has the capacity to produce 6,000 pounds of fried food pieces per hour, when modified according to the present invention, to produce about 10,000 pounds per hour of fried food pieces. Finally, because the food products spend less time in the frying oil, and because the fryer has increased throughput, the quality of the oil will be consistently higher because of the lower duty cycle and potentially higher fresh oil replenishment rate.

The inventive method can also be coupled with a post-fry deoiling step. In one embodiment, the deoiling step uses a steam knife/steam sweep surrounding the takeout conveyor to actively remove oil from the surface of the fried food pieces. As depicted in FIG. 1, the gas knife 20 passes a flow of an inert gas selected from one or more inert gases comprising superheated steam, nitrogen, carbon dioxide, and mixtures thereof, at a positive pressure fed by pump 29 above the fried food pieces and the gas sweep 34 provides a negative pressure provided by pump 39 below said fried food pieces. An oil eliminator can be used to separate the oil collected in the sweep stream.

The inventive method can also be coupled with a post-fry dehydration step. Shelf-stable snack foods are dried to a moisture content below about 2% by weight, or below about 1.5% by weight. In one embodiment, the food pieces described above are finish fried to a moisture content above about 2% by weight, and then subjected to a drying step that dehydrates the food pieces to a moisture content below about 2% by weight, or below about 1.5% by weight. In various embodiments, the drying step can be one or a combination of hot air drying, microwave drying, infrared drying, or impingement drying. Other non-frying drying methods which are known in the art can be used.

EXAMPLES

Control samples of potato chips were made by washing, peeling and slicing potatoes as is known in the art. The potato slices were then washed to remove surface starch. The control slices were fried in a batch immersion frying process at an initial oil temperature of 353° F. for about 190 seconds to a final moisture content below about 2% by weight. The resulting control potato chips had an average oil content of about 43% by weight of potato chips.

A second set of similarly prepared potato slices was fried in a batch immersion fryer at an initial par-fly oil temperature of 353° F. for about 190 seconds, then removed from the batch fryer and, in a second batch fryer, dipped in oil at an initial finish-fry oil temperature of about 190° F. for about 30 seconds. The resulting potato chips had an average oil content of about 62% by weight of potato chips, which was significantly higher than the control sample.

A third set of similarly prepared potato slices was fried in a batch immersion frying process at an initial par-fry oil temperature of 353° F. for about 190 seconds, then removed from the batch fryer and dipped in oil at an initial finish-fly temperature of about 300° F. for about 30 seconds. The resulting potato chips had an average oil content of about 57% by weight of potato chips, higher than the control sample.

A fourth set of similarly prepared potato slices was fried in a batch immersion frying process at an initial par-fry oil temperature of 353° F. for about 190 seconds, then removed from the batch fryer and dipped in oil at an initial finish-fly temperature of about 390° F. for about 30 seconds. The resulting potato chips had an average oil content of about 38% by weight of potato chips, or 5% less oil by weight of the potato chips than the control sample.

Further experiments were done to test whether a shorter residence time in the first fryer could be used prior to the hot oil finish fry step. In one experiment, potato slices were fried in oil that had an initial par-fry temperature of 353° F. for about 80 seconds, then finish fried in oil at an initial finish-fry temperature of about 390° F. for about 10 seconds. The moisture content of the potato chips produced by this process was about 1.2% by weight, and the oil content was about 33% by weight. When the first immersion frying step was increased to 100 seconds and the finish fry step was decreased to 5 seconds, the final moisture content of the potato chips was about 2.11% by weight and the oil content was about 30% by weight. When the first immersion frying step was increased to about 110 seconds and the finish fry step was decreased to 5 seconds, the final moisture content of the potato chips was about 1.25% by weight and the oil content was about 31% by weight.

All of the foregoing experiments were conducted using two batch fryers located next to each other. Potato slices were transferred from one fryer to the other as quickly as possible allowing for minimal cooling and oil drainage. The oil contents of the potato slices described in these examples are provided for comparative purposes only, and do not necessarily reflect the oil levels in commercially available potato chips or potato chips described in the prior art.

Applicants also conducted experiments using an existing continuous potato chip immersion fryer that was modified to add three hot oil curtains over the takeout conveyor. In a control experiment, potato slices were fried using the immersion fryer only and no hot oil curtain to a final moisture content of about 1.4% by weight, which produced potato chips with an oil content of 36.08% by weight. The following table shows the results of several experiments run using the hot oil curtain over the takeout conveyor.

TABLE 1

Hot Oil Curtain Finish Fry Data

| Intermediate Moisture Content | Oil Curtain Temperature | Final Moisture Content | Final Oil Content |
|---|---|---|---|
| 1.8% | 390° F. | 1.3% | 32.64% |
| 2.59% | 390° F. | 1.43% | 31.42% |
| 2.94% | 350° F. | 1.25% | 31.77% |
| 2.94% | 385° F. | 1.02% | 30.57% |
| 2.94% | 410° F. | 1.25% | 31.83% |

In Table 1, all percentages are by weight of the potato slices. The intermediate moisture content is the moisture content of the potato slice after removal from the immersion frying step, and the final moisture content is the moisture content of the potato slices after the hot oil curtain frying step.

Another set of experiments was conducted with tortilla chips. In these experiments, tortilla chip preforms were made by sheeting a masa dough and cutting the sheet into pieces. One set of these preforms was a control set, and was fried in a batch fryer having an initial par-fly oil temperature of about 365° F. for about 55 seconds, to a final moisture content of about 1.4% by weight, which fried tortilla chips exhibited an oil content of about 25.7% by weight. (Known fried tortilla chips produced on a continuous tortilla chip line comprise a moisture content of about 1.1%, and an oil content of about 23.5%.) Other tortilla chip preforms were subjected to a first batch frying step having an initial par-fly oil temperature of about 365° F. for several different time periods, followed by a second batch frying step for 5 seconds in oil at a temperature of 390° F. Experimental sets were run using first frying step times of 25, 30, 35, 40 and 45 seconds, which produced fried tortilla chip sets which comprised about 20%, 20%, 21.5%, 21.5% and 21.5%, respectively. Thus, the experimental sets showed an oil reduction in absolute percentage terms from control of between 5.7% and 4.2% by weight of the chips, and between a 22% and 16% percentage reduction relative to the control sample. These experiments are evidence that the inventive method is applicable across a wide range fried food products.

It will now be evident to those skilled in the art that there has been described herein a method and system that can be used to produce fried food products that have reduced oil content but retain the desirable characteristics of conventionally fried food pieces. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

In sum, while this invention has been particularly shown and described with reference to a preferred embodiment, it will be understood by those skilled in the art that various changes, in form and detail may be made therein without departing from the spirit and scope of the invention.

What is claimed is:

1. A method for making fried food products comprising the steps of:
providing a plurality of food pieces;
par-frying said food pieces by immersion in hot oil, wherein said hot oil comprises an initial par-fry oil temperature and a final par-fry oil temperature, to produce par-fried food pieces;
removing said par-fried food pieces from said hot oil; and
finish frying said par-fried food pieces by contact with hot oil at an initial finish-fry oil temperature, wherein said initial finish-fry oil temperature is higher than said final par-fry oil temperature, to produce said fried food pieces, wherein said par-fried food pieces are maintained at a temperature above 270° F. during said removing, and then through to said finish frying step,
wherein said par-frying step comprises par-frying said food pieces to an intermediate moisture content of between 1.5% and about 15% by weight, wherein said finish frying step comprises finish frying said par-fried food pieces to a final moisture content of less than 2% by weight and less than said intermediate moisture content, and wherein said finish frying step is an immersion frying step with a residence time of less than about 10 seconds.

2. The method of claim 1 wherein said final par-fry oil temperature is between about 270° F. and 350° F., and wherein said initial finish-fry oil temperature is greater than 350° F.

3. The method of claim 1 further comprising a difference between said final par-fry oil temperature and said initial finish-fry oil temperature of at least 30° F.

4. The method of claim 1 further comprising a difference between said final par-fry oil temperature and said initial finish-fry oil temperature of at least 50° F.

5. The method of claim 1 wherein said residence time is less than 5 seconds.

6. A method for making fried food products comprising the steps of:
　providing a plurality of food pieces;
　par-frying said food pieces by immersion in hot oil, wherein said hot oil comprises an initial par-fry oil temperature and a final par-fry oil temperature, to produce par-fried food pieces;
　finish frying said par-fried food pieces by contact with hot oil at an initial finish-fry oil temperature, wherein said initial finish-fry oil temperature is higher than said final par-fry oil temperature, to produce said fried food pieces, wherein said par-fried food pieces are maintained at a temperature above 270° F. between said par-frying and said finish frying steps;
　wherein said par-frying step comprises par-frying said food pieces to an intermediate moisture content of between 1.5% and about 15% by weight, wherein said finish frying step comprises finish frying said par-fried food pieces to a final moisture content of less than 2% by weight and less than said intermediate moisture content, and wherein said finish frying step comprises a residence time of less than about 10 seconds.

7. The method of claim 6 wherein said finish frying step comprises finish frying said par-fried food pieces by passing said par-fried food pieces through at least one hot oil curtain.

8. The method of claim 7 wherein said hot oil curtain is a submerged hot oil curtain in close proximity to a takeout means which removes said food pieces from said hot oil.

9. The method of claim 6 wherein said residence time is less than 5 seconds.

\* \* \* \* \*